United States Patent [19]

Brimer

[11] 4,215,303
[45] Jul. 29, 1980

[54] WASHING MACHINE MOTOR CONTROL SYSTEM

[75] Inventor: Claude M. Brimer, Bryan, Ohio

[73] Assignee: Linear International, Rancho La Costa, Calif.

[21] Appl. No.: 840,160

[22] Filed: Oct. 7, 1977

[51] Int. Cl.² ............................................. H02P 1/44
[52] U.S. Cl. ................................... 318/752; 318/281; 318/285
[58] Field of Search ........... 318/207 R, 207 A, 207 B, 318/207 C, 220 R, 221 R, 227, 281, 283, 285, 751–756

[56] References Cited

U.S. PATENT DOCUMENTS

| | | |
|---|---|---|
| 3,248,908 | 5/1966 | Pope ................................ 318/207 R |
| 3,369,381 | 2/1968 | Crane et al. ...................... 318/281 X |
| 3,800,201 | 3/1974 | Gaul et al. ...................... 318/207 B X |
| 3,896,355 | 7/1975 | Guicheteau ...................... 318/207 B |
| 4,070,604 | 1/1978 | Usry .............................. 318/207 A X |
| 4,081,726 | 3/1978 | Brimer et al. ................... 318/207 A X |

Primary Examiner—Gene Z. Rubinson
Attorney, Agent, or Firm—Lockwood, Dewey, Alex & Cummings

[57] ABSTRACT

A control system for an induction electric motor utilized to drive a top loading agitator washing machine obviates the need for a mechanical transmission between the motor and the agitator of the washing machine. An integrated circuit module in the control system provides a nearly infinitely adjustable rate of output reversal. A plurality of phase shift capacitors enable a variety of output torques to be obtained from the motor.

11 Claims, 5 Drawing Figures

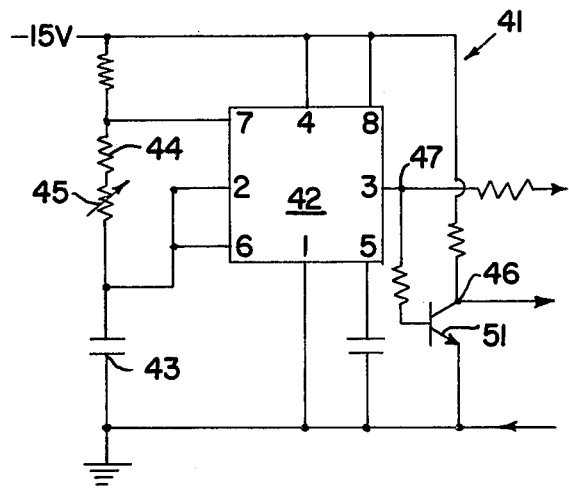
FIG_3_
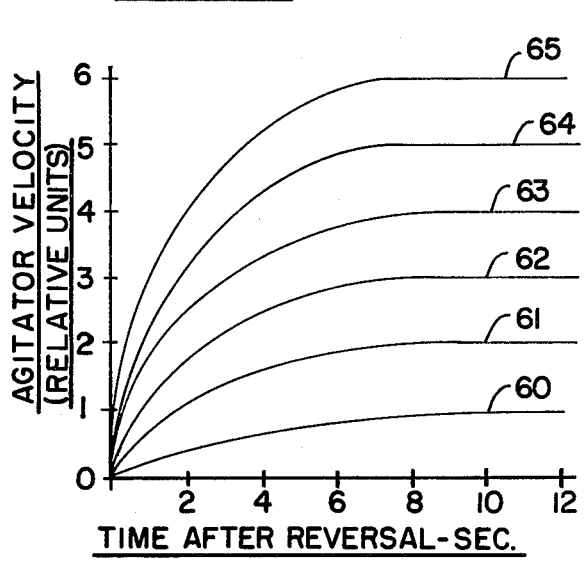
FIG_5_
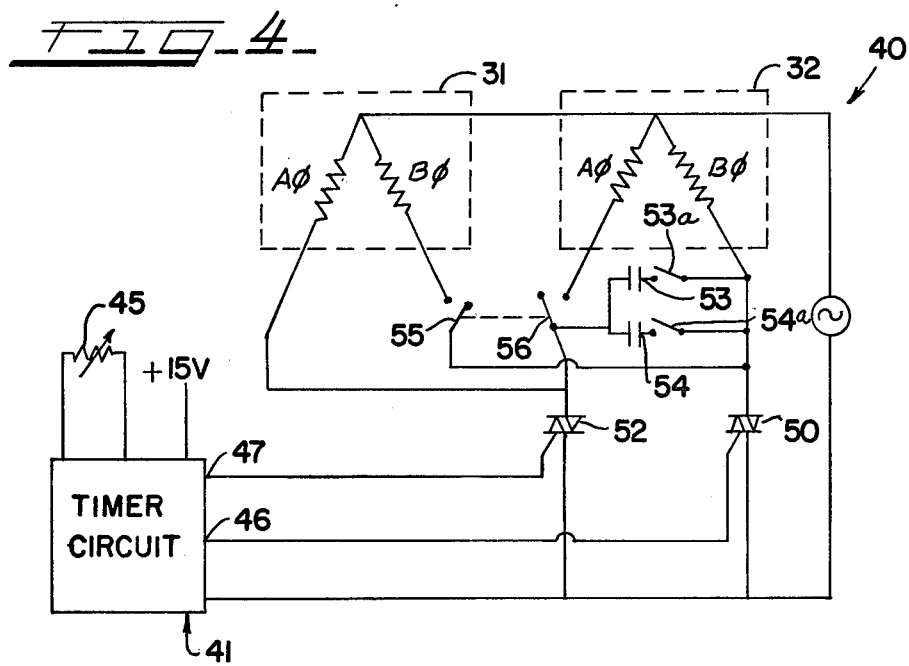
FIG_4_

WASHING MACHINE MOTOR CONTROL SYSTEM

BACKGROUND OF THE INVENTION

This invention relates generally to a control system for a curvilinear induction electric motor, and more particularly, to a system for controlling agitation and spin in an induction motor driven washing machine.

One problem which has confronted washing machine manufacturers has been obtaining a desirable type of agitation motion directly from the output of a low cost electric motor. In this connection, another problem has been obtaining at a low cost a range of agitation characteristics in a washing machine; from a gentle agitation required for delicate fabrics, to a vigorous agitation for heavy fabrics or heavily soiled material. Furthermore, in addition to reciprocatingly driving the agitator, the electric motor driving the washing machine must also have the capability of rapidly spinning the tub or spin basket upon completion of the washing cycle in order to spin dry clothing in the tub.

The conventional means of driving a washing machine tub and agitator is by a mechanical transmission which changes the relatively high speed rotary motion of a conventional fractional horse-power motor into the relatively slower reciprocating motion required by the agitator, and into the rotating motion required by the spin basket. A disadvantage of this conventional mechanical transmission is that it is difficult and expensive to build in a form which provides desirable washing actions from a very gentle motion to a very vigorous motion. Over the years, many attempts have been made to overcome these shortcomings, but in general these attempts have been costly and have been successful only to a limited extent.

In my co-pending patent application entitled "Electric Motor", Ser. No. 638,519, filed Jan. 5, 1976, a novel electric induction motor is disclosed which is particularly well adapted for directly driving rapidly reversible driven members such as washing machine agitators or the like. This motor has a high starting torque output and a relatively direct proportional relation between the applied voltage and available output torques. In my U.S. Pat. No. 3,914,963, which is directed to a rebound assisted reversing system for an induction electric motor, the control of tub reversal is accomplished by utilizing a mechanical elastic rebound member to trigger electrical switches in the motor drive circuit. The need remains to provide a completely electric system for controlling the rate of reversal of the output shaft rotation of the aforesaid electric induction motor, without the use of mechanical transmissions or other mechanical components.

SUMMARY OF THE INVENTION

Accordingly the object of the present invention, generally stated, is the provision of a new and improved electric control system for providing an adjustable rate of reversal for the output shaft rotation of an induction electric motor.

Another object of the present invention is to provide a system for adjustably controlling the rate of reversal of the output shaft of an induction electric motor while further providing for varying the output torque of the motor.

It is a further object of the invention to provide a completely electric control for reversing the agitator or tub in a washing machine wherein the agitator and tub are directly driven by an electric motor.

The present invention is directed to a system for adjustably controlling the rate of output shaft rotation of a curvilinear induction electric motor. The type of motor utilized with the system includes upper and lower stators therein with each stator having at least two phase windings thereon. The control system includes an integrated circuit module adapted for operation as an astable multivibrator. A control circuit is coupled to the module and generates a cyclic control effect which has a variable cycle timing length. An electric circuit in the system serially includes a pair of switching means which are alternately responsive to the cyclic control effect positioned between the windings and the module. A phase shifting capacitance is connected across the windings.

The invention is further directed to a washing machine which includes a housing, a tub and an agitator mounted for rotation within the housing, and an induction electric motor mounted in the housing and drivably connected to the tub and agitator. The improvement includes a system for controlling the rate of output shaft rotation reversal of the electric motor. The system includes an integrated circuit module adapted for operation as an astable multivibrator. A control circuit in the system serially includes means for receiving electric power, a fixed resistor, a variable resistor, and a timing capacitor coupled to the integrated circuit module. Another electric circuit in the system serially includes a pair of gate-controlled semi-conductors which are alternately responsive to a cyclic control effect generated by the control circuit. This electric circuit is connected between the motor windings and the control circuit. A plurality o phase shifting capacitors are connected across the motor windings.

BRIEF DESCRIPTION OF THE DRAWINGS

These and other objects of the present invention will be apparent from the following detailed description of a preferred embodiment, taken in conjunction with the accompanying drawings, wherein:

FIG. 3 is an electrical schematic of the timer circuit portion of the control system of the invention which incorporates an integrated circuit module therein.

FIG. 4 is an electric schematic showing the electrical system of the washing machine of FIG. 1.

FIG. 5 is a graph showing the relative speed-power characteristics produced by an electric motor controlled by the system of the present invention.

DETAILED DESCRIPTION OF THE PREFERRED EMBODIMENT

While the control system of the invention may be incorporated with my previously identified induction electric motor to drive many types of machines, such as tumbling barrels used for deburring or polishing, lapidary equipment used for polishing of precious or semi-precious stones, or even rotating drum or so-called pulsator types of washing machines, an important aspect of the control system of the present invention is found in connection with my induction electric motor when the same are incorporated in a top-loading agitator-type washing machine. The latter mentioned washing machine is presently the most common and widely used type of washing machine. The system of the present invention, which provides complete solid state electronic washing machine control, together with my induction electric motor, provide a means for making a washing machine having a novel configuration, due to the absence of a mechanical transmission between the electric motor and the conventional agitator and tub, and also due to the elimation of any other mechanical means of motor control, such as limit switches, reaction arms, or the like.

Figure 1:
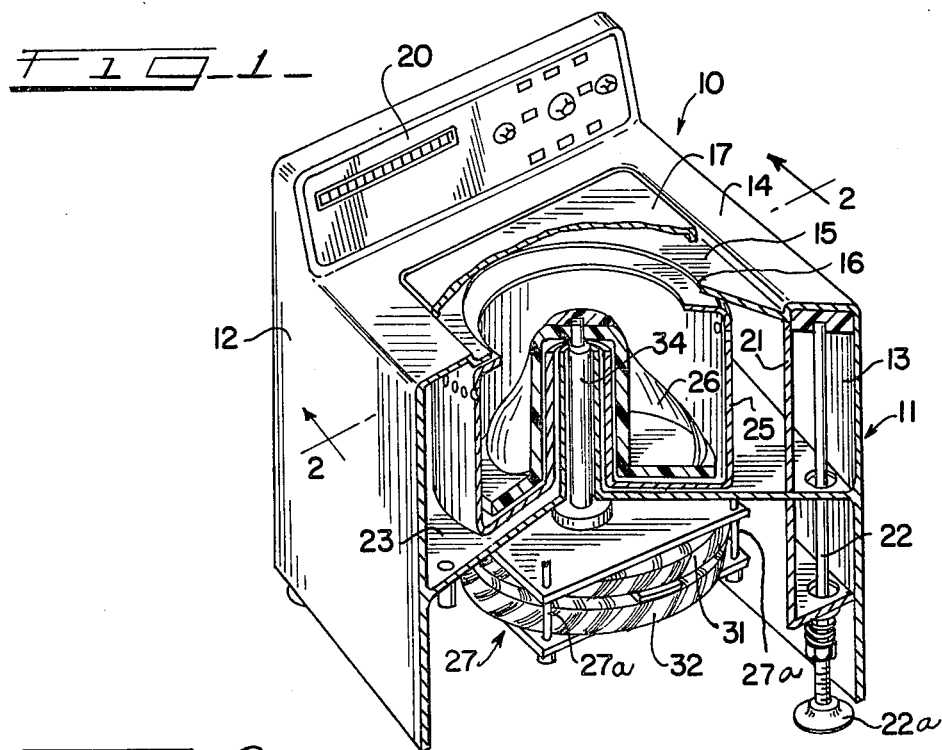
FIG. 1 is a perspective view, partially cut away, of an improved washing machine driven by an induction electric motor wherein the rate of reversal of the output shaft rotation of the motor is controlled by a system constructed in accordance with the present invention.

Referring to FIG. 1, a top-loading agitator type washing machine constructed in accordance with the present invention is generally indicated at 10 and, in this embodiment, includes a housing-frame combination which may be inexpensively made of sheet metal or the like, or which may be partially or fully formed of molded plastic material. The type of housing-frame construction shown is generally noted as monocoque or semi-monocoque construction wherein structural loads are shared between the outer skin and inner framework, with the skin providing reinforcement for various openings and mountings. The monocoque housing, generally indicated at 11, includes opposed side surfaces 12, 13, a front surface (not shown), a top surface 14 extending inwardly of the top edges of the sides and front surface. Top surface 14 includes a recessed portion 15 therein with an annular aperture 16 positioned centrally thereon which define the top opening through which clohing or fabrics are fed into the washing machine. A cover 17 is fitted into the recessed portion 15 of the top surface 14 and hingedly attached to one side thereof. The back surface 18 of the housing may either completely cover the rear of the washing machine, or may only partially cover the machine, and in either case may be removable for access to the inside of the housing 11. A console or control panel 20 is positioned to extend upwardly from the top surface 14 of the washing machine at the rear thereof. Console 20 includes control dials, such as 20a, 20b, and 20c, which will be discussed below in connection with the control system of the invention.

Inside of the outer skin or exterior surfaces of housing 11, a plurality of gusset plates 21—21 are mounted with one such plate being positioned across each corner of the housing 11 to strengthen and add rigidity to the total structure. In this embodiment, a vibration absorbing rod 22 having a foot or pod 22a at the bottom thereof is mounted inside each triangular area defined by the gusset plates and the corners of the housing. Each rod 22 is fixedly attached to the housing at the top thereof and forms a mounting which connects the machine 10 with the floor (not shown) upon which it is mounted. The rods dampen any vibration of the housing to maintain the washing machine in fixed position on a floor. This mounting system is the subject of applicant's U.S. Pat. No. 4,007,612, issued Feb. 15, 1977. It can be understood that other types of suspension mechanisms can be utilized with the control system.

A horizontal mounting member or sheet 23 extends across the largely hollow interior of housing 11 and is connected with the sidewalls of the housing to form a bulkhead including a tubular mounting member 24 mounted centrally thereon and extending vertically therefrom to provide a mounting for a tub 25 and agitator 26 in axially aligned relation thereon. The tub 25 is of conventional configuration and includes a central tubular member 25a extending upwardly from the bottom thereof, and the agitator 26 also includes a central tubular member 26a. Both the tub tubular member 25a and the agitator tubular member 26a are axially aligned with and positioned over the bulkhead tubular mounting member 24.

Figure 2:
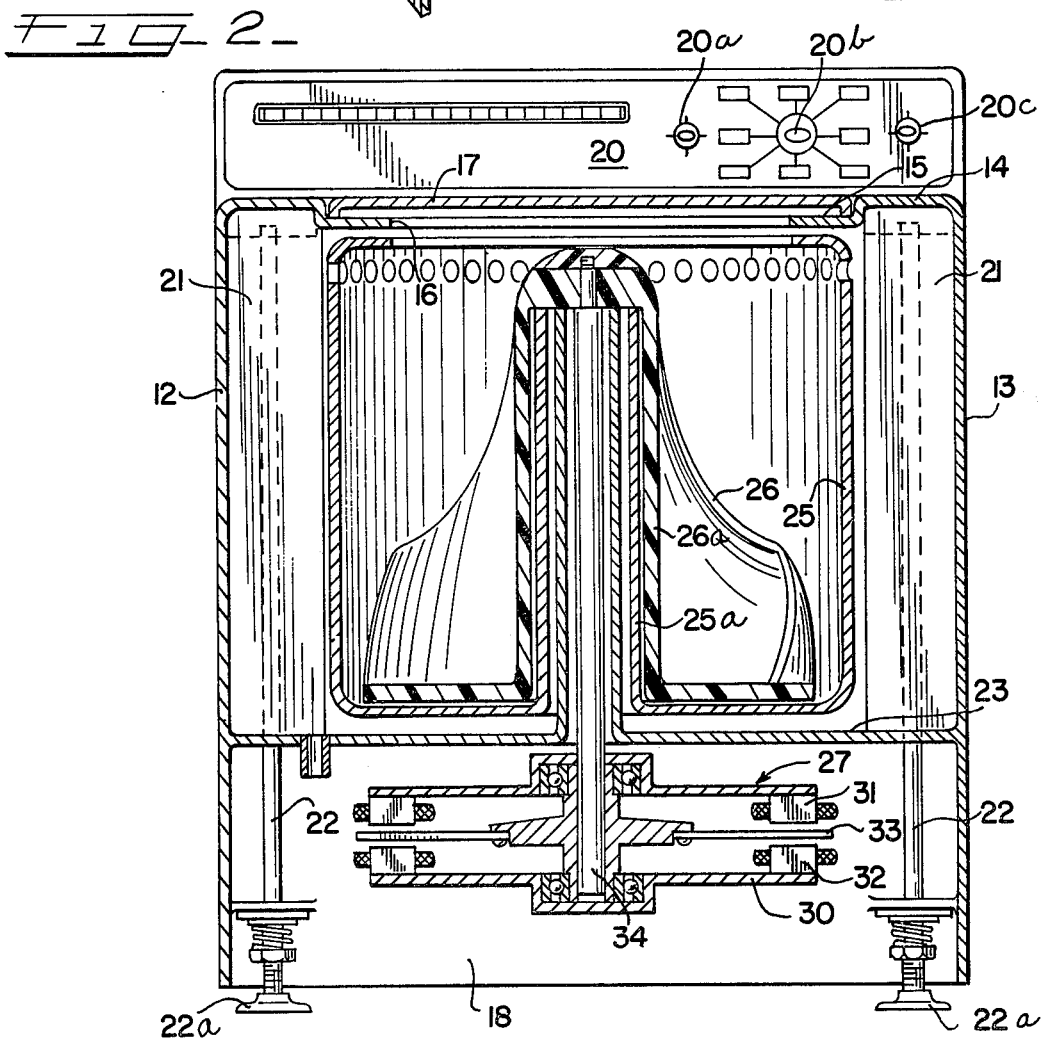
FIG. 2 is an enlarged cross-sectional view with portions shown in full of the washing machine taken substantially along line 2—2 of FIG. 1.

While the tub 25 and agitator 26 are rotatably mounted on top of the horizontal bulkhead 23, the alternating current curvilinear induction electric motor, generally indicated at 27, is mounted below the central bulkhead in a secure manner by a plurality of supports 27a—27a. Induction motor 27 includes a motor housing 30, opposed upper and lower stators 31, 32, respectively, and an annular rotor disc 33 positioned between the stators and bearingly mounted in the motor housing. An elongate output shaft 34 is securely mounted to the rotor 33 by a key or the like. The output shaft 34 extends upwardly and outwardly of the motor housing 30, through the hollow center of the bulkhead mounting tube 24 until, at its upper end, it is securely mounted to the top of the tubular members of the tub 25 and agitator 26. The electric motor 27 is preferably constructed in accordance with my co-pending application entitled "Electric Motor", Ser. No. 638,519, filed Jan. 5, 1976. As shown most clearly in FIGS. 1 and 2, the output shaft 34 of the induction electric motor 27 is directly connected to the tub 25 and agitator 26 without the aid of a mechanical transmission. Therefore, the utilization of a means for controlling the reversal of the rotor disc 33 in motor 27, and preferably a solid state completely electrical control means constructed in accordance with the invention, will control the movement of the agitator 26 and the spin basket or tub 25, as desired for all types of washing cycles. With the unusual construction of the washing machine shown in FIGS. 1 and 2, a nearly infinite variety of washing actions are uniquely capable of being programmed for it. The motor torque, which drives the agitator without any intervening gear or other mechanical transmission means, may be varied over relatively wide limits. The present invention, which allows a wide variation in the stroke time or length, when used in conjuction with the widely variable torque from the motor, is capable of achieving a large range of washing actions.

As shown most clearly in FIGS. 3 and 4, the electrical system of the washer, generally indicated at 40 in FIG. 4, includes a timer circuit, generally indicated at 41 in FIGS. 3 and 4, which generates a pulsating or cyclic control signal to the remainder of the system. As shown most clearly in FIG. 3, the timer circuit 41 includes as its main component an integrated circuit timer module or chip 42. One such module or chip which may be utilized is manufactured by Motorola, Inc. and designated by the Part No. MC 1555. Electrical terminals on the module 42 are designated by the small numerals (1–8) and the Figure indicates how the various terminals are connected into the timer circuit 41. When the integrated circuit module 42 is utilized in the timer circuit 41 the resultant operates as an astable multivibrator, the rate of operation of the multivibrator being dependent on the charging time of capacitor 43. This charging time is dependent on the capacitance of the capacitor and the rate of current flowing into it. That rate of current is controlled, in this embodiment, by a fixed resistor 44 and a variable resistor or potentiometer 45 which are positioned in the circuit between the capacitor 43 and a constant voltage power source, which is 15 volts in this embodiment. Typically, variable resistor 45 would appear on control panel 20 as one of the knobs 20a, 20b, or 20c.

The output signals from the timing circuit 41, which appear at terminals 46 or 47, are applied to respective ones of gate-controlled triacs 50 and 52. These triacs may be conventional in design and operation, and, in the instant example, are marketed by the General Electric Co. as type 2N 6,343.

Initially, at the begining of an agitator cycle the signal at terminal 46 biases an NPN transistor 51 into conduction to short the current to prevent triac 52 from being energized. After a period of time depending upon the duration of the control signal from timing circuit 41, the next signal from that circuit biases off triac 50 and biases on the second triac 52. The first signal through triac 50 causes the AC induction electric motor 27 to turn in a clockwise direction. The signal through triac 52 causes the motor to turn in a counter-clockwise direction. It can be seen that by properly selecting the value of resistor 45, the rate of reversal of the AC induction electric motor 27 and hence the rate of agitation can be controlled over wide limits. Prototype machines constructed in accordance with this invention have realized variable agitation rates of from less than one half second to more than one minute. This wide variation from less than one stroke per minute to more than one hundred and twenty strokes per minute results in a very wide variation in washing action.

Referring again to FIG. 4, the induction motor 27 includes an upper stator 31 and lower stator 32, each including an A phase and a B phase winding. The currents in the windings are rendered electrically out-of-phase by the provision of phase shifting capacitors 53 and 54 across the stator winding. The torque of motor 27 will vary depending upon the total capacitance connected across the stator. Switches 53a, 54a provide for changing this capacitance, and hence the torque of the motor. For example, if the capacitance of capacitor 53 is 10 mfd. and the capacitance of capacitor 54 is 20 mfd., then capacitances of 10, 20 or 30 mfd. are available depending on which switches are closed. If the electric motor 27 were engineered to give maximum torque with a capacitance of 30 mfd. across its phases, then the lower values of capacitance produce lower torques.

Referring again to FIG. 4, it will be noted that additional switch contacts 55 and 56 are provided in series with the upper and lower stator windings, respectively. Contacts 55 and 56 are contained or ganged in a single DPST switch so that both contacts open or close at the same time. Opening switches 55 and 56 electrically disconnect the B-phase of the upper stator 51 while concurrently disconnecting the A-phase of the lower stator 52. The disconnection of half of the functional stators results in a reduction of torque, in the present case a reduction of approximately 60%. By proper switching of switches 53a, 54a, and the dual switches 55, 56 six combinations of motor output torque are selectable. The switch could be located for ease of access on the control panel 20 at 20a, 20b, or 20c, in a conventional manner.

Referring to FIG. 5, a chart shows the time/velocity relationship available for using the control system of the invention for a motor with a constant load. Since the excursion and the rate of movement of the output shaft is a function of the time it is allowed to move in a given direction and of the amount of torque causing such movement, the control system of the invention gives a wide choice of both time and torque available for such motion, which results in an unusually wide choice of washing actions. Utilizing the capacitance values of the example previously given, the graph 2 of FIG. 5 indicates at Line 60 the use of half of the motor stators in connection with the 10 mfd. capacitor. Line 62 shows the utilization of half the motor stators together with both of the capacitors in parallel (30 mfd.). Line 63 shows the utilization of both phases in both stators, with switches 55 and 56 enclosed, together with the 10 mfd. capacitor. Line 64 shows the utilization of all four phase windings together with the 20 mfd. capacitor, and line 65 shows the utilization of the full motor with both capacitors (30 mfd.) in parallel across the windings.

While one particular embodiment of the invention has been shown and described, it will be obvious to those skilled in the art that changes and modifications may be made without departing from the invention in its broader aspects. For example, if switches 55 and 56 were operable separately, and one were open while the other was closed, the torque produced during rotation in one direction would be greater than the torque produced during rotation in the opposite direction. This may be desirable for certain uses. Therefore, the aim in the appended claims is to cover all such changes and modifications as fall within the true spirit and scope of the invention.

I claim:

1. A system for adjustably controlling the rate of output shaft rotation reversal of an induction electric motor of the type including upper and lower stators therein with each stator having at least two phase windings thereon, said system comprising:
   an astable multivibrator;
   a control circuit electrically connected to said astable multivibrator for generating a cyclic control effect therefrom having a variable cycle time length; and
   means establishing an electric circuit serially including a pair of gate-controlled semi-conductors alternately responsive to said cyclic control effect between said windings and said astable multivibrator, and
   a phase shifting capacitance electrically connected in parallel with said windings.

2. The system as described in claim 1 wherein said control circuit serially includes
   means for receiving AC power from a source thereof;
   a variable resistor; and
   a timing capacitor.

3. The system as described in claim 2 wherein
   said variable resistor includes a predetermined minimum resistance value.

4. The system as defined in claim 1 wherein said phase shifting capacitance includes
   a plurality of capacitors switchably connected across said windings.

5. The system as defined in claim 4 wherein
   said phase shifting capacitors have unequal capacitance values.

6. The system as defined in claim 1 wherein
   said electric circuit includes switching means for stopping current flow to at least one winding in each of said upper and lower stators for diminishing the torque output of said motor.

7. The system as defined in claim 1 wherein said electric circuit includes switching means for stopping current flow to at least one winding in at least one of said upper and lower stators for diminishing torque output of said motor in one direction of rotation.

8. In a washing machine including
a housing;
a tub including an agitator therein and mounted for rotation in said housing;
an induction electric motor mounted in said housing and drivably connected to said tub and agitator, said motor including upper and lower stators therein, with each stator having at least two phase windings thereon;
an improved system for controlling the rate of output shaft rotation reversal of said electric motor, said system comprising:
an astable multivibrator;
a control circuit serially including means for receiving electric power from a source thereof, a variable resistor, and a timing capacitor coupled to said astable multivibrator for generating a cyclic control effect therefrom having a variable time length; and
means for establishing an electric circuit serially including a pair of gate-controlled semiconductors alternately responsive to said cyclic control effect between said windings and said control circuit, and a plurality of phase shifting capacitors connected in parallel with said windings.

9. The washing machine as defined in claim 8 wherein
said phase shifting capacitors have unequal capacitance values for providing a plurality of torque output values for said motor.

10. The washing machine as defined in claim 8 wherein
said electric circuit includes switching means for stopping current flow to at least one winding in each of said upper and lower stators for diminishing the torque output of said motor.

11. The washing machine as defined in claim 8 wherein
said electric circuit includes switching means for stopping current flow to at least one winding in at least one of said upper and lower stators for diminishing the torque output of said motor in one direction of return.

* * * * *